United States Patent
Ramos et al.

(10) Patent No.: US 7,912,812 B2
(45) Date of Patent: Mar. 22, 2011

(54) SMART DATA CACHING USING DATA MINING

(75) Inventors: Jo Arao Ramos, Grapevine, TX (US); John Baxter Rollins, Southlake, TX (US); David Giddens Wilhite, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 354 days.

(21) Appl. No.: 11/970,337

(22) Filed: Jan. 7, 2008

(65) Prior Publication Data

US 2009/0177667 A1 Jul. 9, 2009

(51) Int. Cl.
G06F 17/00 (2006.01)

(52) U.S. Cl. .......................... 707/609; 711/118

(58) Field of Classification Search ................ 707/609, 707/661, 705, 804, 825; 711/118, 129, 161, 711/E12.07
See application file for complete search history.

(56) References Cited

U.S. PATENT DOCUMENTS

| | | | |
|---|---|---|---|
| 6,539,382 B1 | 3/2003 | Byrne et al. | |
| 6,889,292 B1 * | 5/2005 | Alexander et al. | 711/129 |
| 6,920,458 B1 * | 7/2005 | Chu et al. | 707/600 |
| 6,950,823 B2 | 9/2005 | Amiri et al. | |
| 7,451,137 B2 * | 11/2008 | Crivat et al. | 1/1 |
| 2005/0033621 A1 | 2/2005 | Hartmann et al. | |
| 2005/0125401 A1 | 6/2005 | Carr et al. | |
| 2005/0240652 A1 | 10/2005 | Crick | |
| 2006/0069702 A1 | 3/2006 | Moeller et al. | |
| 2006/0218132 A1 | 9/2006 | Mukhin et al. | |
| 2007/0088915 A1 | 4/2007 | Archambault et al. | |

OTHER PUBLICATIONS

Duling, David; Thompson, Wayne. "Maximizing Data Mining Effectiveness Through More Efficient Model Deployment." SAS Users Group International, Philadelphia, Apr. 10-13, 2005. SAS Institute Inc., 2005.

Nag, Biswadeep, et al; "Caching for Multi-Dimensional Data Mining Queries." Proceedings of the 2001 SCI Conference, Orlando, Florida, Jul. 2001.

Ng, Vincent T. Y., et al; "Prefetching XML Data with Abstract Query Mining." Proceedings of the International Conference on Information Technology: Coding and Computing (ITCC'04). IEEE, Computer Society, 2004.

Huang, Yin-Fu; Hsu, Jhao-Min; "Mining Web Logs to Improve Hit Ratios of Prefetching and Caching." Proceedings of the 2005 IEEE/WIC/ACM International Conference on Web Intelligence (WI'05). IEEE, Computer Society, 2005.

* cited by examiner

*Primary Examiner* — Fred I Ehichioya
(74) *Attorney, Agent, or Firm* — Mollborn Patents, Inc.; Fredrik Mollborn (57) ABSTRACT

Methods and apparatus, including computer program products, implementing and using techniques for populating a data cache on a server. Data requests received by the server are collected in a repository. A data mining algorithm is applied to the collected data requests to predict a set of data that is likely to be requested during an upcoming time period. It is determined whether the complete set of predicted data exists in the data cache. If the complete set of predicted data does not exist in the data cache, the missing data is retrieved from a database and added to the data cache.

20 Claims, 5 Drawing Sheets

SMART DATA CACHING USING DATA MINING

BACKGROUND

This invention relates to data caching. A multi-tier environment typically includes a data server (for example, a relational database server, a multi-dimensional database server, or a file server), an application server, and consumers (such as end users or processes). In some implementations, the multi-tier environment can also include an additional tier for specialized functions. In other implementations, all of these functions may reside on a single tier. In a typical use scenario, a consumer issues requests to an application, which in turn issues requests to a data server. There can be many different types of requests. For example, a relational database application issues SQL requests, a web application can issue Extensible Markup Language (XML) or XQuery requests, a multi-dimensional database application, such as an Online Analytical Processing (OLAP) application, can issue requests in the form of Multi-Dimensional Expressions (MDX), and so on.

The application performance can be improved by pre-fetching data from the database server and storing the pre-fetched data in non-persistent memory, typically referred to as a data cache, either on the data server or on the application server. Although the memory capacity of servers continues to increase, disk storage capacity is increasing at an even faster rate, resulting in a declining ratio of memory to disk storage and necessitating a more efficient way to populate the data cache.

In some implementations, it is possible to populate the data cache either before a consumer begins requesting data, or on demand per each request. Although data caching can significantly improve performance, it does have some drawbacks. For example, the data cache may not be able to hold all of the data in memory, especially for applications retrieving large amounts of data. A second drawback is that when the data cache is populated on demand, the first request for data pays a high price in response time. A third drawback is that when the data cache is pre-populated, the total amount of data that could be cached may be too large to fit in the available memory cache. A fourth drawback is that when the data cache is populated on demand, some data must be removed as the data cache fills up. This cleanup process typically uses a simple first-in first-out or least-recently-used policy to decide which data should be removed. However, this does not ensure that the most important data is kept in the data cache. Thus, more efficient methods are needed to populate the data cache to ensure that necessary data is already available when requested by consumers.

SUMMARY

In general, in one aspect, the invention provides methods and apparatus, including computer program products, implementing and using techniques for populating a data cache on a server. Data requests received by the server are collected in a repository. A data mining algorithm is applied to the collected data requests to predict a set of data that is likely to be requested during an upcoming time period. It is determined whether the complete set of predicted data exists in the data cache. If the complete set of predicted data does not exist in the data cache, the missing data is retrieved from a database and added to the data cache.

The invention can be implemented to include one or more of the following advantages. A more efficient method is provided for populating a data cache, either in real-time mode or in batch mode, by using data mining techniques to evaluate workloads, discover query patterns of consumers (users and/or applications), and anticipate which data needs to be in the cache based on these discovered patterns. Needed information is added to the cache, and unneeded information is deleted from the cache. That is, caching decisions can be made dynamically in anticipation of consumers' requests. As a result, a significant performance advantage over existing caching processes is achieved, and the response times for consumers are significantly improved.

The details of one or more embodiments of the invention are set forth in the accompanying drawings and the description below. Other features and advantages of the invention will be apparent from the description and drawings, and from the claims.

DESCRIPTION OF DRAWINGS

Like reference symbols in the various drawings indicate like elements.

DETAILED DESCRIPTION

Overview

The various embodiments of the invention described herein pertain to data caching enhancements. In particular, data mining algorithms, such as clustering, associations, sequences, and so on, are applied against query workloads to discover users' or applications' query patterns and represent those patterns in data mining models. The data mining models are then applied in an automated process to direct the retrieval of data from the data source and populate the data cache in either batch or real-time mode.

In batch mode, the data mining models determine how to pre-populate the cache before users log in to the system, based on past query patterns. In real-time mode, the data mining models are applied to requests as soon as those requests are issued. Referred to as real-time scoring, this process identifies the data that consumers (users or applications) are most likely to request next, based on the patterns of their current requests. Batch or real-time scoring can be automated within the database containing the mining models and query logs in order to anticipate queries and to pre-cache the data that is most likely to be requested. This capability offers a significant performance advantage over existing caching processes that are unable to make caching decisions dynamically in anticipation of users' or applications' requests.

Various embodiments of the invention will now be described by way of example in the context of an OLAP application, and with reference to the drawings. It should however be realized that the principles described below are equally applicable to other application, such as relational database applications or web applications.

Exemplary Architecture

Figure 1:
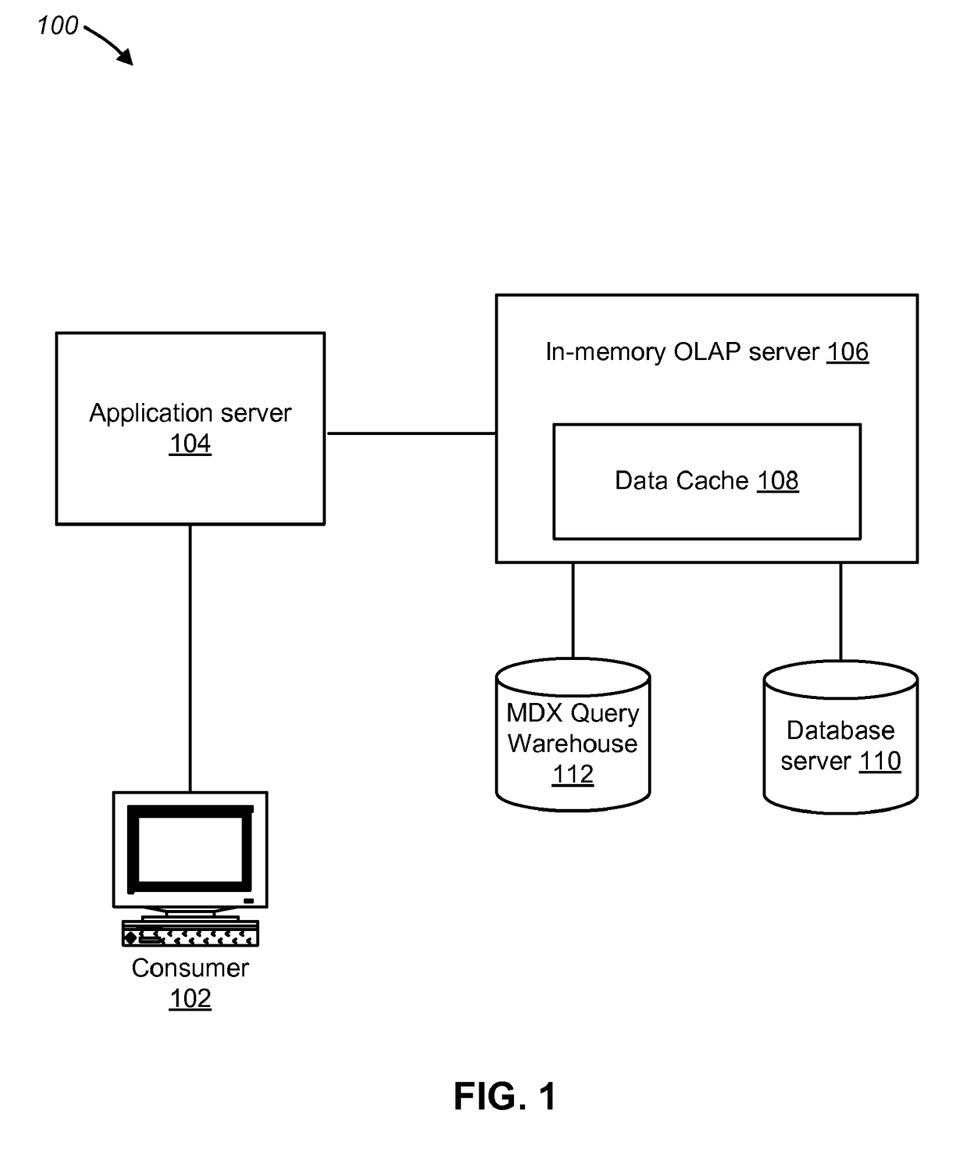
FIG. 1 shows a schematic illustration of an exemplary architecture in which the various embodiments of the invention can be implemented.

FIG. 1 shows an example of an architecture (100) in which the various embodiments of the invention can be implemented. As can be seen in FIG. 1, the architecture includes a data server (106), in this case illustrated by an in-memory OLAP server, an application server (104), and a consumer (102). It should be noted that although only a single consumer (102) is illustrated in FIG. 1, in a typical real life situation, there can be hundreds or thousands of consumers (102). The consumers may be people, such as end users, or processes. The in-memory OLAP server (106) includes a data cache (108), which holds data that is to be served to the consumers (102), and will be described in further detail below. As can be seen in FIG. 1, a database server (110) and an MDX query warehouse (112) communicate with the in-memory OLAP server (106). The functionalities of the database server (110) and the MDX query warehouse (112) will be described in further detail below.

As is well known to those of ordinary skill in the art, OLAP is a process for aggregating and organizing data into multi-dimensional structures referred to as data cubes. An OLAP data cube contains measures (such as sales, profit, and so on) and dimensions (such as time, products, and markets). Each dimension can potentially have many associated levels and hierarchies (such year, quarter, and month). A cube is typically constructed from a relational database as aggregates of hierarchies and intersections of levels. OLAP servers can either store cubes in persistent (disk) storage, in non-persistent (memory) storage, or in a combination of both storage types. While the embodiments of the invention described herein use in-memory OLAP server architecture (non-persistent storage) as an example to explain how the some embodiments of the invention works, it should also be realized that other embodiments of the invention apply to OLAP server architectures using any combination of persistent and/or non-persistent cubes.

End users (102) can query and retrieve results from an OLAP cube much faster than directly from the relational database server (110). In addition, the cube simplifies how an end user can express and dynamically change complex queries. Queries against an OLAP cube are expressed in a format called Multi-dimensional Expressions (MDX). When data is not in the cube cache, a given MDX query may generate multiple SQL queries to the database server (110), potentially increasing the response time for the query by orders of magnitude. The in-memory OLAP server (106) is an architecture for storing multidimensional data in memory. With in-memory OLAP, data retrieved from the relational database server (110) is stored in the data cache (108). This allows subsequent queries and calculations to be performed more quickly.

Conventional OLAP Queries

Figure 2:
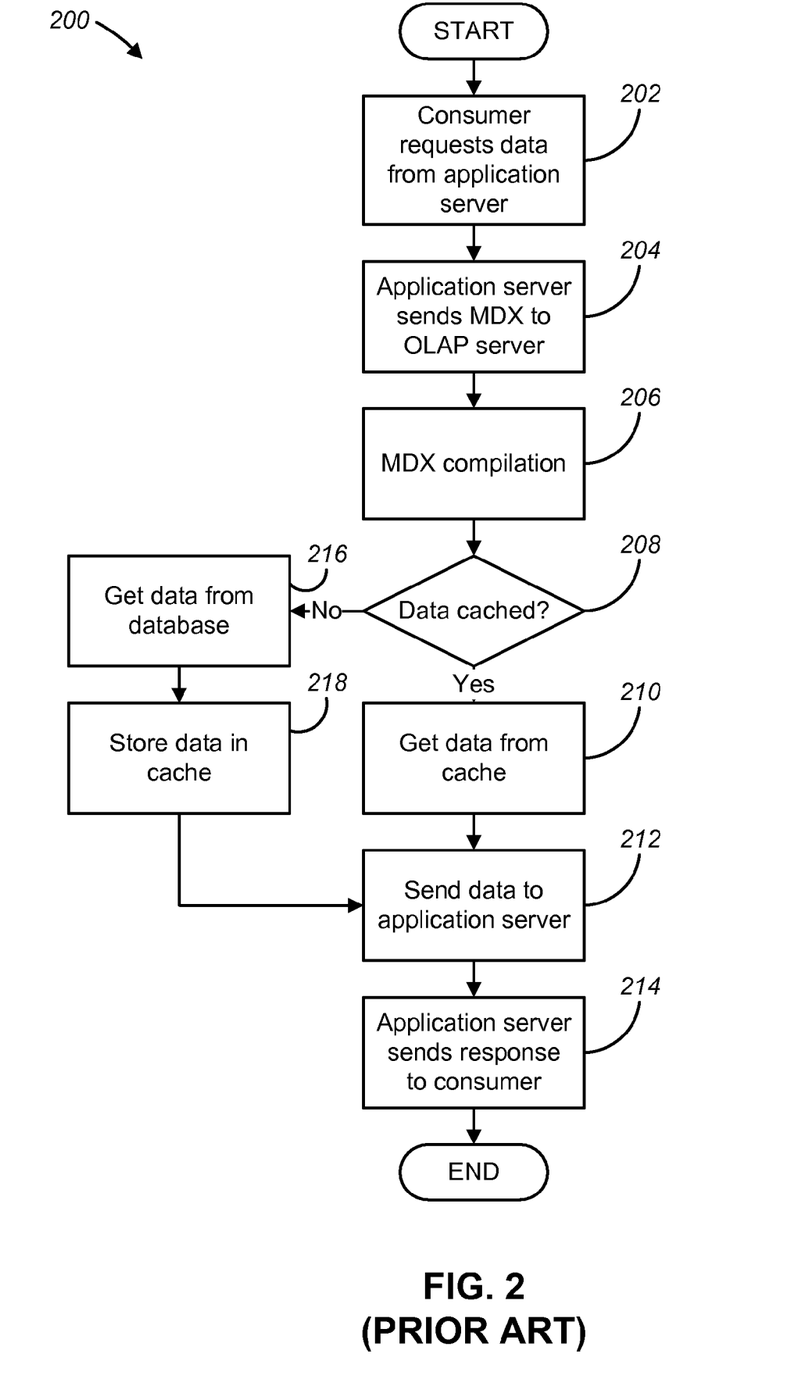
FIG. 2 shows a schematic flowchart of a conventional on-demand query scenario in the OLAP environment of FIG. 1.

FIG. 2 shows a schematic flowchart of a conventional on-demand query scenario (200) in the OLAP environment of FIG. 1. As can be seen in FIG. 1, a consumer (100) performs an action that requests data from an application that incorporates one or more OLAP cubes (step 202). In response to receiving the request from the consumer (100), the application server (104) sends an MDX request to the in-memory OLAP server (106) (step 204). A single MDX query can request data at multiple levels of aggregation and multiple intersection points across many dimensions. The MDX request is compiled by the in-memory OLAP server (106) (step 206). During compilation, the in-memory OLAP determines which portions of the requested data are already in cache, which portions of the data need to be retrieved from the relational database, and what SQL queries are needed to retrieve the data. The MDX expression is evaluated to determine whether the necessary data already resides in the OLAP server data cache (108) (step 208). If the data does exist in the data cache (108), the data is retrieved from the data cache (108) (step 210), and the result is sent to the application server (104) (step 212) and returned to the consumer (102) (step 214), which ends the process (200).

If it is determined in step 208 that the data is not already in the data cache (108), then the OLAP server multiple requests, such as SQL queries, are dispatched to the relational database server (110) (step 216). The responses to the requests from the database server (110) are then stored in the data cache (108) (step 218), from which they are retrieved and sent to the consumer, as described above with respect to steps 212 and 214.

OLAP Queries with an MDX Query Warehouse

Figure 3:
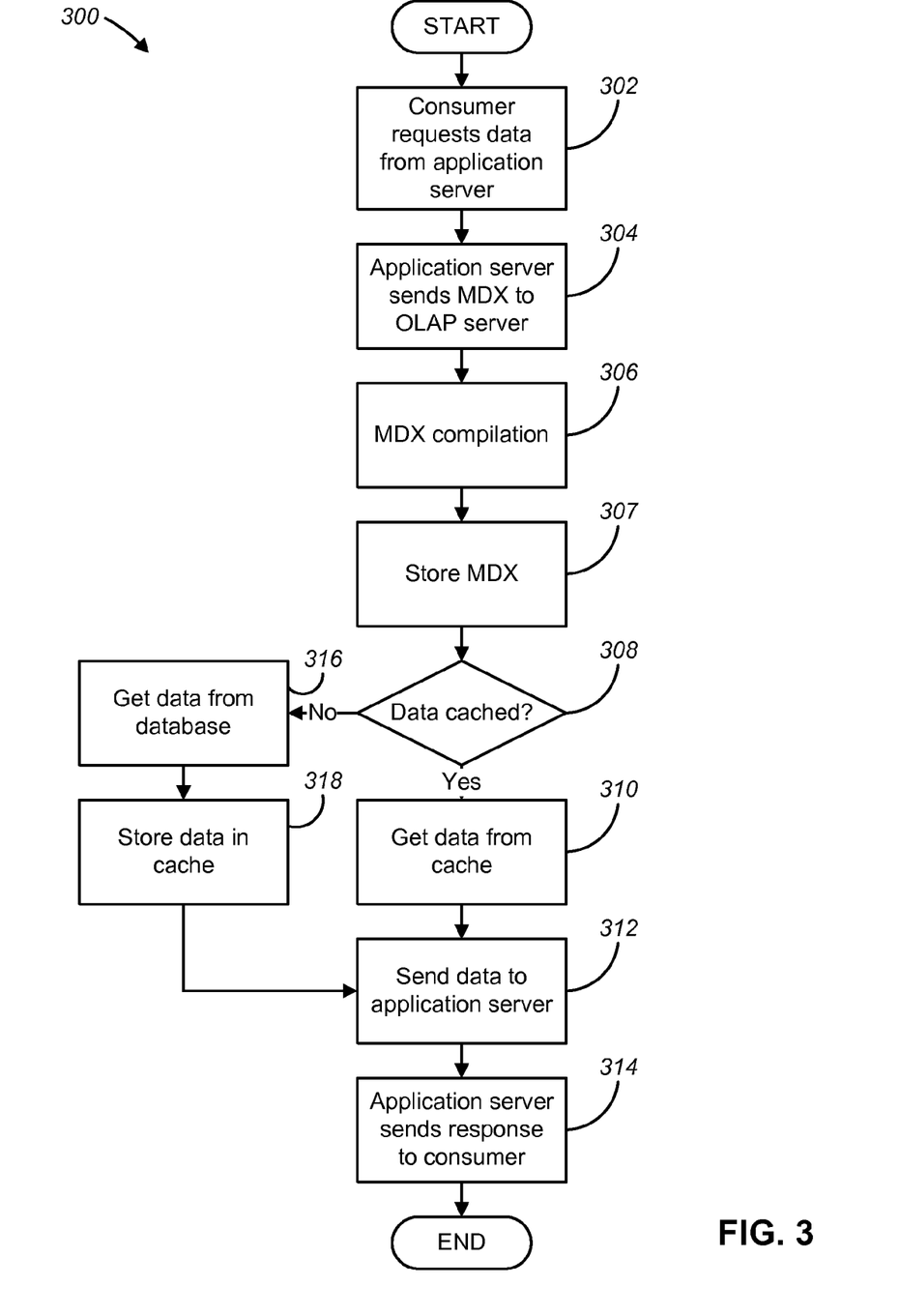
FIG. 3 shows a schematic flowchart of an on-demand query scenario that further uses the MDX Query Warehouse of FIG. 1.

In the above scenario of FIG. 2, the role of the MDX query warehouse (112) was left out in order to provide an easily understandable example. FIG. 3 shows a schematic flowchart of an on-demand query scenario (300) that includes the MDX Query Warehouse of FIG. 1. The processes involved in this scenario are well known to those of ordinary skill in the art. As can be seen in FIG. 3, steps 302-318 are similar to steps 202-218 of FIG. 2. However, in the scenario (300) illustrated in FIG. 3, the queries from all the consumers, which is referred to as a query workload, are stored in the MDX query warehouse (112) (step 307) before a process determines whether the data already exists in the data cache (108) (step 308). Thus, the MDX query warehouse (112) serves as a repository for all historical queries on the system (100). This repository is continually populated as new queries are issued by consumers. The MDX queries are parsed by some extract-transform-load (ETL) process to create attributes describing the characteristics of each MDX query. These attributes are stored in relational tables to be used by the data mining models.

Data Mining Process

Using the query attribute information in the MDX query warehouse (112), a data mining process can be used to improve the caching process in accordance with various embodiments of the invention. As described above, the MDX query warehouse (112) contains the attributes of the historical query workload issued by consumers against the OLAP cubes residing on the in-memory OLAP server (106). The data mining process creates data mining models based on historical query attributes to discover patterns of consumers' query behaviors. The data mining models are applied to new and/or recent queries in a scoring process (explained below) to anticipate which data is most (and least) likely to be needed by consumers, thereby enabling another process to manage the cache. That is, the workload information in the MDX query warehouse (112) can be used to create data mining models that enable the data mining process to discover and quantify combinations of queries that may occur simultaneously or sequentially. These data mining models are stored, for example, in a database table in an industry-standard Predictive Model Markup Language (PMML) format.

To illustrate this idea further, consider that queries are based on MDX or SQL language consisting of standardized linguistic elements. As is well known to those of ordinary skill in the art, because the elements are standardized, the queries can be parsed and their attributes then stored in a relational table. For example, an MDX query might have the following structure:

```
            SELECT
                { Column Headers} ON COLUMNS,
                { Row Headers} ON ROWS
            FROM [Cube Name]
            WHERE [ Filtering conditions ]
```

As an example, the MDX query to request sales information on particular products, customers, and time period might look like the following:

```
SELECT
    {[Customers].[All Customers].[USA].Children} ON COLUMNS,
    {[Products].[All Products].[Women Shoes].Children} ON ROWS
FROM [Sales_Cube1]
WHERE ([Measures].[Sales], [Time].[2007].[QTR1])
```

In this example, the elements of the MDX query are:
1. SELECT—select column headers and row headers
2. FROM—name of OLAP cube containing the data
3. WHERE—data filters In a given system, the queries are dynamically generated by consumers (users or applications) (102). A given query can be issued by a single consumer or by multiple consumers. The frequency with which each query is issued may vary widely, for example, a particular query can be executed just once a day, once a week, once a month, and so on, or the query can be executed multiple times in different time periods.

In one implementation, in order to use queries in a data mining process, each individual query is parsed. The query attributes, along with additional information such as username and the date and time that the query was executed, are stored in a transactional table layout format appropriate for data mining methods of associations or sequences and/or in a behavioral format appropriate for data mining methods of clustering, classification, or regression.

This table of query attributes is used in creating a data mining model. The model is developed using historical query attributes. The data mining model discovers groups of queries with similar characteristics and/or combinations of queries that occur simultaneously or sequentially. The data mining model can be based on any appropriate conventional type of data mining models, such as clustering, associations, or sequences. The choice of model type (e.g., clustering vs. sequences) depends on how the system administrator wants to implement the data mining process to help manage the cache. As the skilled person realizes, other data mining methods may also be appropriate.

Clustering is a data mining method that serves to discover groups (that is, clusters or segments) of individuals (that is, queries) whose characteristics are similar within a given cluster and are different across clusters. For example, in a batch scoring process, which will be described in further detail below, a clustering model can be applied to the entire query workload to discover groups of queries that have similar characteristics, so that the cache can be pre-populated accordingly. As another example, a clustering model can be applied to the queries for a selected subset of consumers to pre-populate the cache according to query patterns for that subset of consumers (e.g., where certain consumers are active only on certain days of the week).

Associations is a data mining method that serves to discover combinations of attributes, conditions, and/or actions that tend to occur together. An associations model discovers combinations of queries that occur frequently enough to justify managing the cache on the basis of those related queries. For example, a dashboard may require multiples queries to be executed, so that a consumer's request to access this dashboard initiates the simultaneous execution of a group of queries. For example, in a batch scoring process, an associations model can be applied to a set of queries to determine which other queries are most likely to be requested at the same time, so that the cache can be pre-populated accordingly.

Sequences is a data mining method that serves to discover combinations of attributes, conditions, and/or actions that tend to occur sequentially over time. A sequence consists of a series of requests from a consumer, resulting in several queries being executed one after the other over some time period. A sequences model discovers sequences that apply to a sufficient number of consumers to warrant managing the cache on the basis of those sequential behaviors. For example, in a real-time scoring process, a sequences model can be applied to a new query from a particular consumer to determine which queries are most likely to be requested next by that consumer over some time period, so that the cache can be updated accordingly.

In accordance with one implementation of the invention, the various data mining models can be used in either batch mode or in real-time mode, which will now be described in further detail.

Batch Mode Operation

Figure 4:
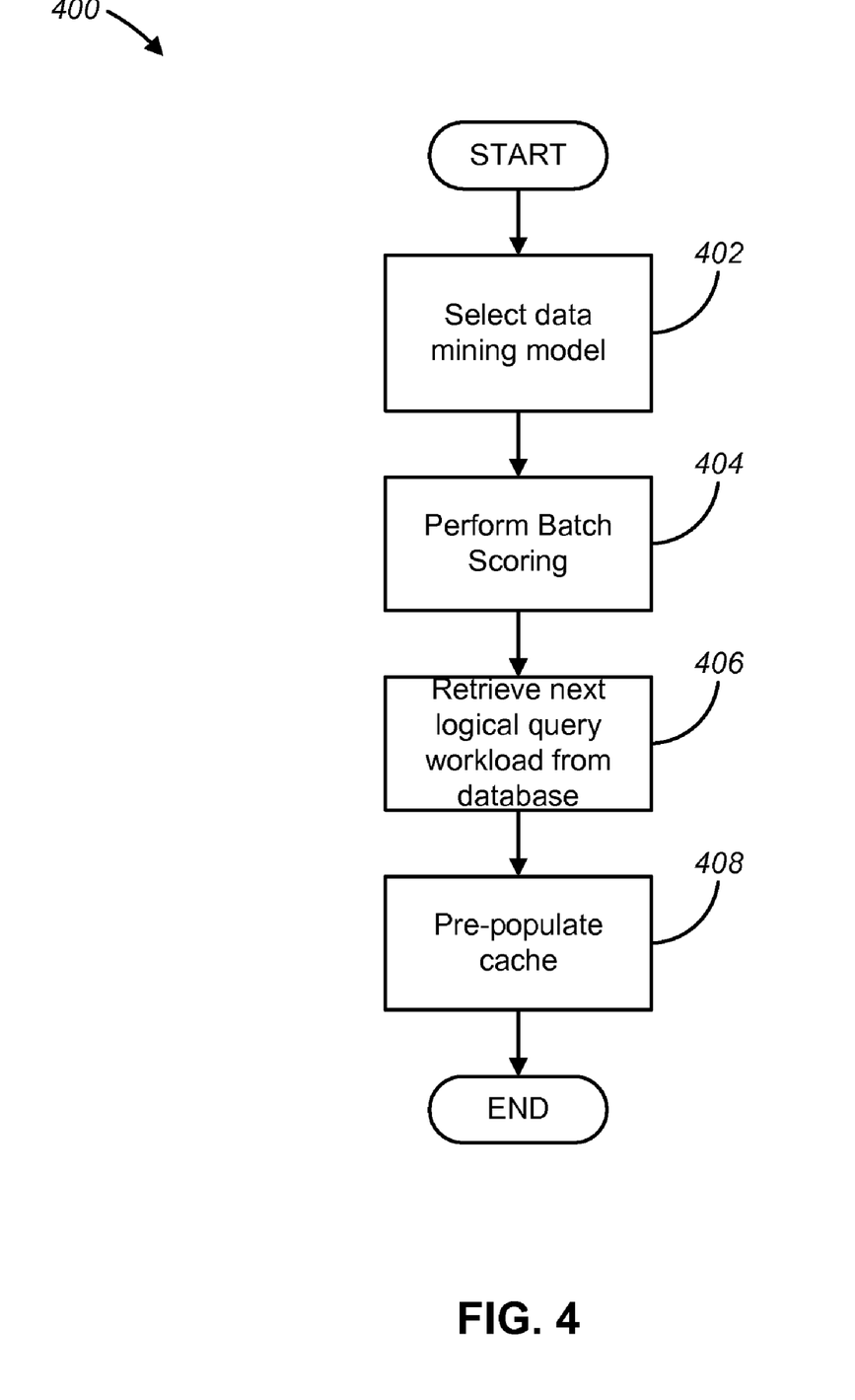
FIG. 4 shows a schematic flowchart of a smart data caching process in batch mode, in accordance with one implementation of the invention.

FIG. 4 shows a schematic flowchart of a smart data caching process (400) in batch mode, in accordance with one implementation of the invention. The purpose of the process (400) is to pre-populate the data cache (108) based on a data mining model before consumers begin requesting data, such that the requested data is readily available in the data cache (108) before the consumers actually request the data, thereby reducing the response times to the requests.

As can be seen in FIG. 4, the process (400) starts by selecting a data mining model (step 402). For example, a clustering model can be refreshed (re-executed with updated data) on a daily basis to incorporate the most current queries along with the historical query workload. A system administrator and/or a system process can identify and select the clusters that are most appropriate and best represent the next upcoming workload, such as the typical workload for a specific day of the week or for a given week.

Next, a batch scoring process is performed (step 404). Batch scoring involves applying a data mining model to new queries and assigning each query to its best-fit cluster in the model, that is, to the cluster representing the query profile (combination of query attributes) to which the given query is most similar. Combinations of query attributes represented by the clusters indicate queries that have a high probability of being executed during the same time period or event of interest. Cluster characteristics can be extracted from the data mining model either automatically by the data mining process or on demand by a system administrator.

Once the batch scoring has been performed, the process selects the queries with highest confidence to be requested in the upcoming time period and, if necessary, executes the queries against the database server (110) to retrieve the data (step 406). Finally, the data cache (108) is pre-populated for the relevant time period, which ends the process. The data cache (108) now contains the data that is most likely to be requested by the consumers for the upcoming time period. As a result, steps 216-218 of FIG. 2 and steps 316-318 of FIG. 3 can be completely or almost completely avoided, which makes the data retrieval process described in FIGS. 2 and 3 much more efficient.

It should also be noted that in some implementations, the process (400) does not only pre-populate the data cache (108) with expected data for an upcoming time period. The process (400) can also identify old data that is no longer expected to be used in the next upcoming workload and clear the cache of such data.

Real-Time Mode Operation

Figure 5:
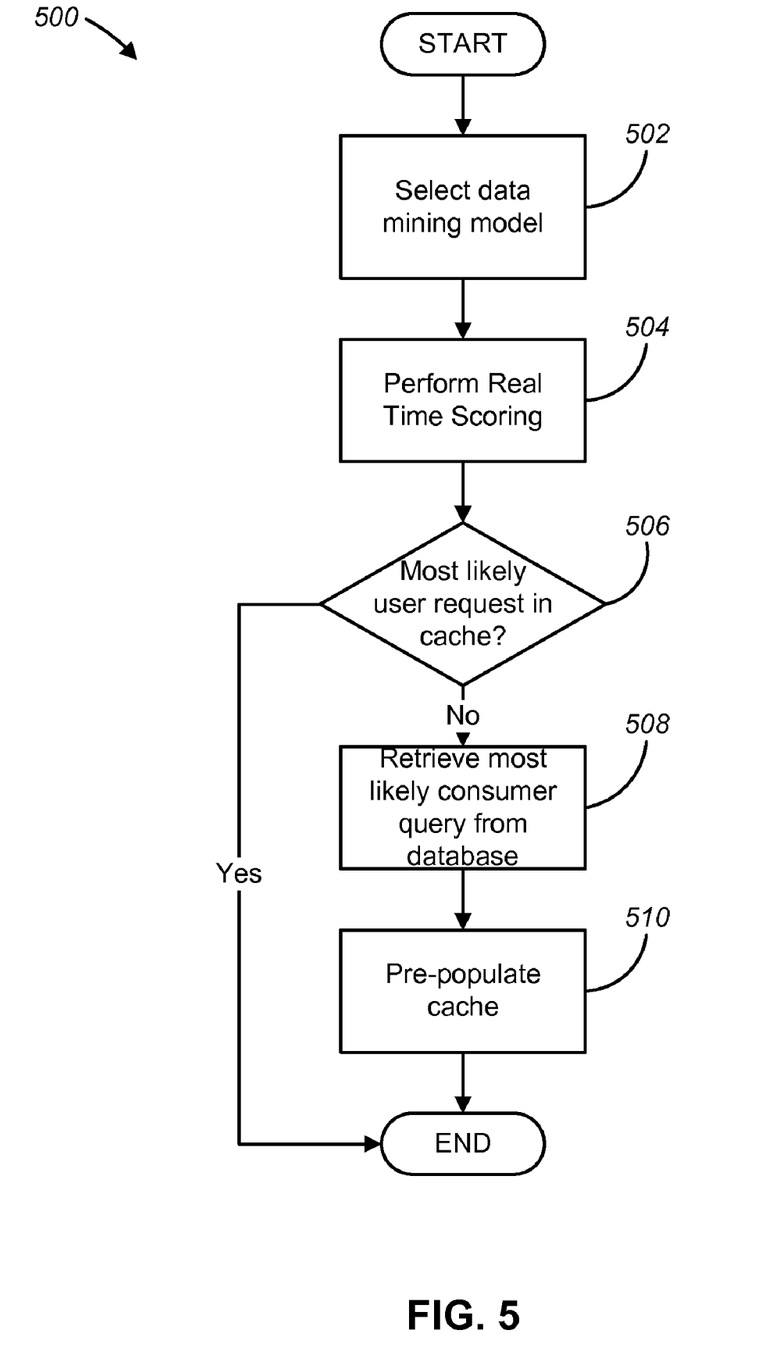
FIG. 5 shows a schematic flowchart of a smart data caching process running in real-time mode, in accordance with one implementation of the invention.

FIG. 5 shows a schematic flowchart of a smart data caching process running in real-time mode, in accordance with one implementation of the invention. The main goals and principles of the real-time operating mode are the same as for the batch mode described above, that is, to pre-populate the data cache (108) with data that is likely to be requested by the consumers, and thus minimize the number of time-consuming accesses to database server (110). However, in the real-time mode, in contrast to the batch mode described above with respect to FIG. 4, the data cache (108) is pre-populated continuously based on a data mining model representing the patterns of consumers' (102) query requests.

As was discussed above, consumers (102) submit requests, which are continuously collected by the in-memory OLAP server (106) and passed to the MDX query warehouse (112). The data caching process (500) calls a data mining model (step 502) and applies the data mining model in real time to score (step 504) the new data request as the new data request streams into the MDX query warehouse (112). The scoring process is automated and can be implemented as a database function. For example, a sequences data mining model can indicate the next most likely request that is to be issued by a particular consumer (102), given the consumer's requests issued up to that particular time. The process then checks the contents of the data cache (108) to determine whether the data to feed the next most likely request is already in the data cache (108) (step 506). If the data to feed the next most likely request is not already in the data cache (108), the process retrieves the data from the relational database server (110) (step 508) and pre-populates the data cache (108) (step 510), and the process (500) ends. If it is determined in step 506 that the data already exists in the data cache (108), then there is no need to retrieve the data from the database server (110), and the process ends. In either case, the end result is that the data most likely to be requested next by a consumer will be stored in the data cache (108), and thus the number of requests to the database server (110) will be minimized, thereby causing a more efficient caching process.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

A number of implementations of the invention have been described. Nevertheless, it will be understood that various modifications may be made without departing from the spirit and scope of the invention. Accordingly, other embodiments are within the scope of the following claims.

The invention claimed is:

1. A computer-implemented method for populating a data cache on a server the method comprising:
   collecting new data requests received by the server from a plurality of users in a repository containing historical data requests received by the server from the plurality of users;
   applying a data mining algorithm to the data requests in the repository to discover patterns in the data requests received from the plurality of users and to predict a set of data that is likely to be requested by the plurality of users during an upcoming time period, based on the discovered patterns;
   determining whether the complete set of predicted data exists in the data cache; and
   in response to determining that the complete set of predicted data does not exist in the data cache, retrieving the missing data from a database and adding the missing data to the data cache.

2. The method of claim 1, wherein applying the data mining algorithm includes applying the data mining algorithm at a time when no consumers are submitting data requests, wherein the data mining algorithm generates a predicted set of data based on past query patterns for the consumers.

3. The method of claim 1, wherein applying the data mining algorithm includes applying the data mining algorithm in real time as data requests are received, wherein the data mining algorithm generates a predicted set of data based on identified patterns of the current data requests.

4. The method of claim 1, wherein the data requests are in one of the following formats: a Structured Query Language request, an Extensible Markup Language request, and a Multi-Dimensional Expression request.

5. The method of claim 1, wherein the data mining algorithms are selected from the group consisting of: clustering algorithms, associations algorithms and sequences algorithms.

6. The method of claim 1, further comprising:
   serving data from the cache to a consumer in response to a request from a consumer.

7. The method of claim 1, further comprising:
   identifying old data in the data cache that is not expected to be used during the next time period; and
   clearing the data cache of the identified old data.

8. The method of claim 1, wherein applying the data mining algorithm further includes:
   parsing the collected data requests; and
   storing data request attributes in one or more of: a transactional table layout format and a behavioral format.

9. The method of claim 8, wherein the data request attributes include one or more of: a username for the user submitting the data request, a date the data request was submitted, a time the data request was submitted, and parsed elements of the requests.

10. The method of claim 1, wherein the data cache is embodied in one of: a persistent storage medium, a non-persistent storage medium, and a combination persistent and non-persistent storage media.

11. A computer readable storage medium storing program instructions for populating a data cache on a server, the program instructions comprising:
   first program instructions to collect new data requests received by the server from a plurality of users in a repository containing historical data requests received by the server from the plurality of users;
   second program instructions to apply a data mining algorithm to the data requests in the repository to discover patterns in the data requests received from the plurality of users and to predict a set of data that is likely to be requested by the plurality of users during an upcoming time period, based on the discovered patterns;
   third program instructions to determine whether the complete set of predicted data exists in the data cache; and
   fourth program instructions to, in response to determining that the complete set of predicted data does not exist in the data cache, retrieve the missing data from a database and adding the missing data to the data cache.

12. The computer program product of claim 11, wherein the program instructions to apply the data mining algorithm includes program instructions to apply the data mining algorithm at a time when no consumers are submitting data requests, wherein the data mining algorithm generates a predicted set of data based on past query patterns for the consumers.

13. The computer program product of claim 11, wherein the program instructions to apply the data mining algorithm includes program instructions to apply the data mining algorithm in real time as data requests are received, wherein the data mining algorithm generates a predicted set of data based on identified patterns of the current data requests.

14. The computer program product of claim 11, wherein the data requests are in one of the following formats: a Structured Query Language request, an Extensible Markup Language request, and a Multi-Dimensional Expression request.

15. The computer program product of claim 11, wherein the data mining algorithms are selected from the group consisting of: clustering algorithms, associations algorithms and sequences algorithms.

16. The computer program product of claim 11, wherein the computer readable storage medium further stores:
   fifth program instructions to serve data from the cache to a consumer in response to a request from a consumer.

17. The computer program product of claim 11, wherein the computer readable storage medium further stores:
   sixth program instructions to identify old data in the data cache that is not expected to be used during the next time period; and
   seventh program instructions to clear the data cache of the identified old data.

18. The computer program product of claim 11, wherein the program instructions to apply the data mining algorithm include program instructions to:
   parse the collected data requests; and
   store data request attributes in one or more of: a transactional table layout format and a behavioral format.

19. The computer program product of claim 18, wherein the data request attributes include one or more of: a username for the user submitting the data request, a date the data request was submitted, a time the data request was submitted, and parsed elements of the requests.

20. The computer program product of claim 11, wherein the data cache is embodied in one of: a persistent storage medium, a non-persistent storage medium, and a combination persistent and non-persistent storage media.

* * * * *